No. 809,337. PATENTED JAN. 9, 1906.
R. SYMMONDS, Jr.
POWER TRANSMITTING MECHANISM FOR MOTOR VEHICLES.
APPLICATION FILED APR. 7, 1905.
2 SHEETS—SHEET 2.
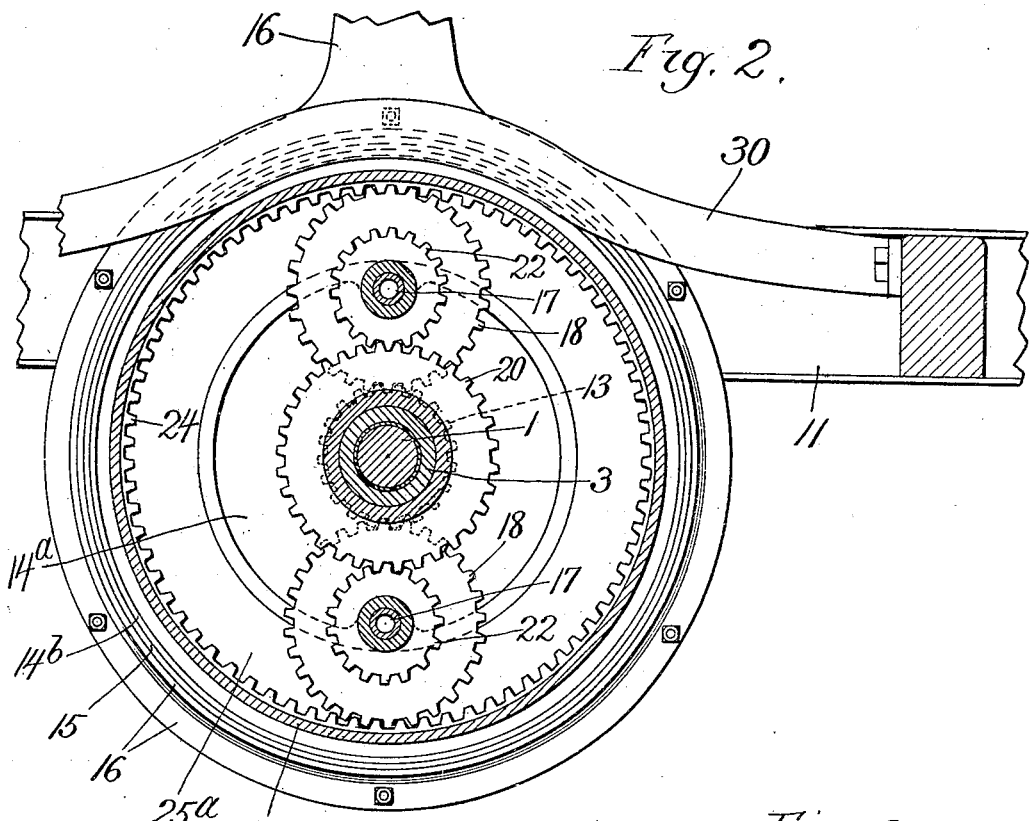
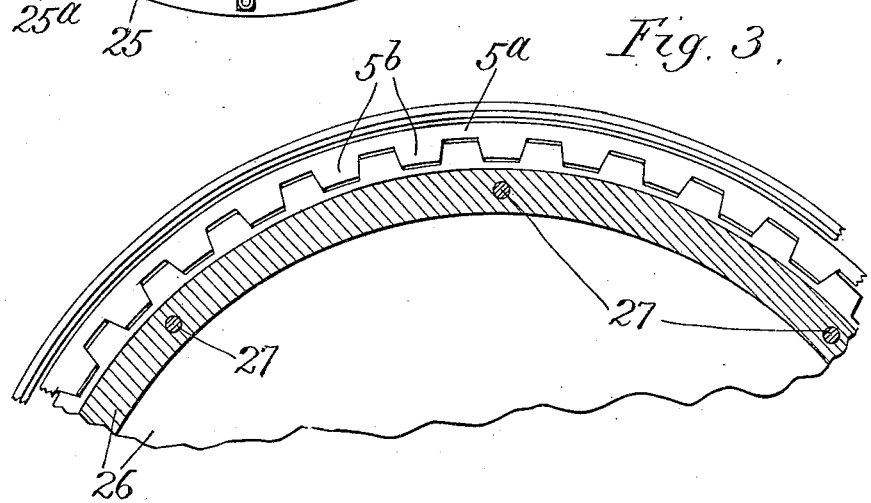
Witnesses.
Edward T. Wray.
Fred G. Frischer
Inventor.
Robert Symmonds Jr.
by Burton Burton
his Atty's.

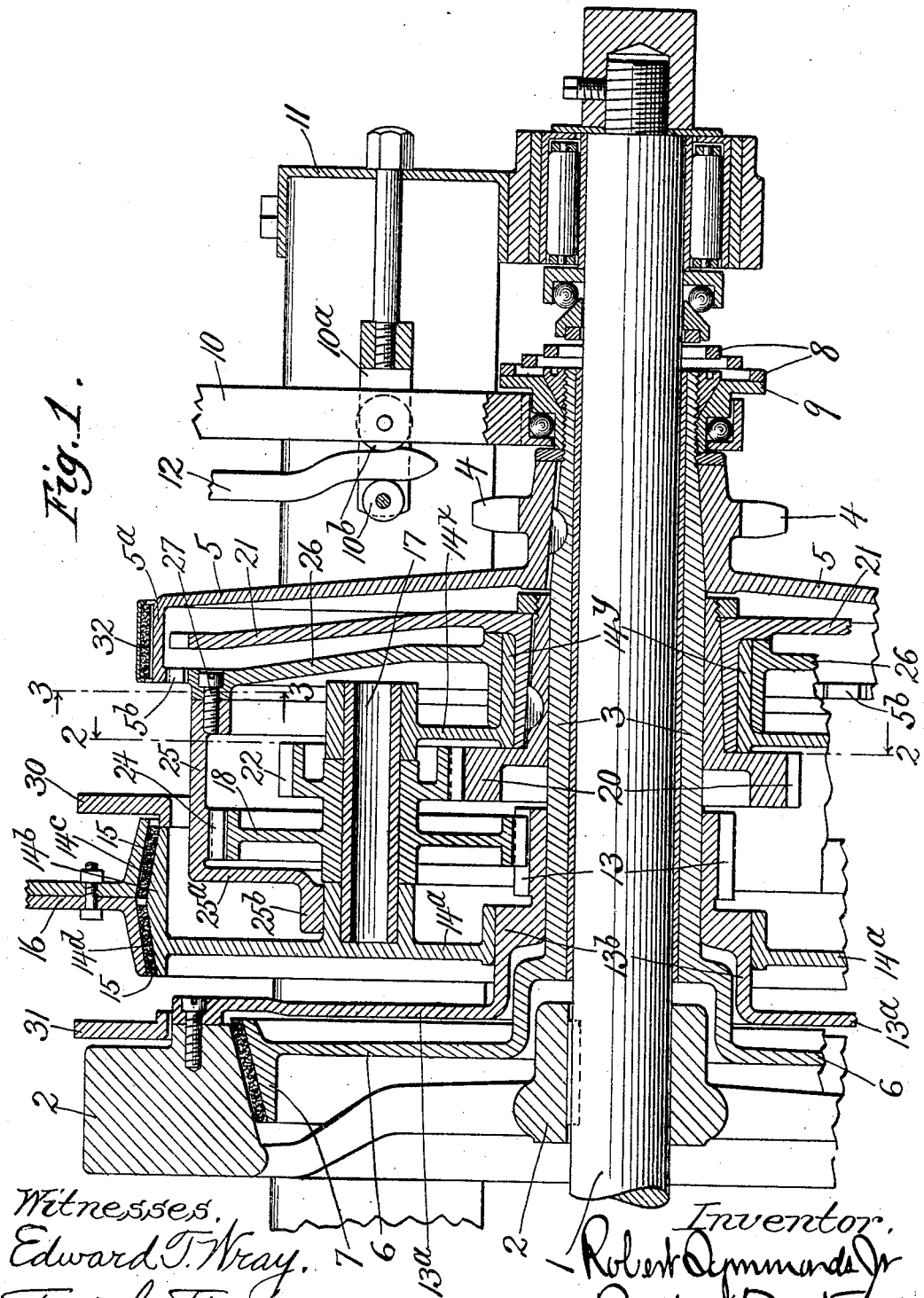

UNITED STATES PATENT OFFICE.

ROBERT SYMMONDS, JR., OF KENOSHA, WISCONSIN, ASSIGNOR TO THOMAS B. JEFFERY, OF KENOSHA, WISCONSIN.

POWER-TRANSMITTING MECHANISM FOR MOTOR-VEHICLES.

No. 809,337.      Specification of Letters Patent.      Patented Jan. 9, 1906.

Application filed April 7, 1905. Serial No. 254,378.

*To all whom it may concern:*

Be it known that I, ROBERT SYMMONDS, Jr., a citizen of the United States, residing at Kenosha, in the county of Kenosha and State of Wisconsin, have invented new and useful Improvements in Power-Transmitting Mechanism for Motor-Vehicles, of which the following is a specification, reference being had to the accompanying drawings, forming a part thereof.

The purpose of this invention is to provide an improved mechanism for transmitting power from the motor with the wheel or axle of a motor-vehicle.

It consists of the elements and features of construction set out in the claims.

In the drawings, Figure 1 is a section through the power-transmitting devices axial with respect to the main power shaft and wheel broken away at one side of the shaft to avoid mere duplication. Fig. 2 is a section at the line 2 2 on Fig. 1. Fig. 3 is a detail section at the line 3 3 on Fig. 1.

The power-shaft 1 may be understood as continuously driven by the motor by means not shown. It has rigid with it a fly-wheel 2, hereinafter termed the "power-wheel." On the shaft there is a power-transmitting sleeve 3, which is rigid with the power-transmitting wheel 4, the latter being a sprocket-wheel by means of which power may be transmitted to the vehicle axle or wheels. (Not shown.) Rigid with the power-transmitting sleeve and power-transmitting wheel there is a brake-disk 5, which has on the inner side of the brake-flange $5^a$ a structure which amounts substantially to an internal gear-rim $5^b$, which, however, in the particular organization shown operates merely as a clutch member, as hereinafter explained. On the end of the power-transmitting sleeve 3 opposite that at which the power-transmitting wheel 4 is fixed there is rigid with the sleeve a disk 6, having a friction-flange 7 for driving engagement with the inner sloping circumference of the rim of the fly-wheel 2, and the sleeve and parts rigid with it have longitudinal movement with respect to the shaft sufficient for taking the frictional flange 7 into and out of driving engagement with the fly-wheel rim. A spring 8, stopped on the power-shaft, reacts against the collar 9 on the end of the sleeve 3 for holding the friction-flange 7 in driving engagement with the fly-wheel rim, and a shipping-lever 10, suitably supported and guided on the vehicle structure, serves to retract the sleeve for taking the friction-flange out of such driving engagement. The particular manner of mounting and operating the shipping-lever 10 is not material to the present invention; but it may be understood from the drawings that the shipping-lever fulcrumed at some point not shown is controlled in the proper movement by the stem $10^a$, guided on the frame-bar 11 and having stud-and-roll abutments $10^b$ $10^b$, between which the wedge 12 is engaged and adapted to be thrust endwise for giving lateral movement to the shipping-lever.

When the flange 7 is in driving engagement with the fly-wheel rim, the full speed of the fly-wheel being communicated to the power-transmitting wheel 4, the vehicle receives high speed in forward direction. For low speed and reversing, the mechanism now to be described is provided.

13 is a gear concentric with the shaft 1 and exterior to the sleeve 3, on which it may be journaled. This gear is made rigid with the power-wheel 2 by means of the disk $13^a$, which extends past the disk 6 and flange 7 and is bolted to the side of the fly-wheel rim, as seen in Fig. 1. The cylindrical portion $13^b$, connecting the gear 13 with its disk $13^a$, affords journal-bearing for one member $14^a$ of a gear-frame, which is thus mounted for rotation about the axis of the shaft 1, sleeve 3, and gear 13. For purposes hereinafter explained this gear-frame has the member $14^a$ provided at its outer circumference with a friction-flange $14^b$, which has two oppositely-sloping friction-surfaces $14^c$ and $14^d$, which are represented as faced with suitable material, as leather, for affording frictional engagement, (represented at 15,) and embracing the oppositely-sloping surfaces of this friction-flange there is provided the double frusto-conical shoe 16, which is mounted on the vehicle-frame with capacity for movement longitudinally with respect to the shaft 1 and which is of such interior diameter as to permit the rotation freely within it of the gear-frame, with its frictional flange, when the shoe is set at a certain intermediate position within a range of movement which it may have, a slight movement in either direction from such intermediate position being sufficient to bring one or the other of the frusto-conical surfaces of the shoe into frictional engagement with the corresponding sloping or frusto-conical surface of the flange. The gear-frame comprises, in addition to the member $14^a$, a coöperating member $14^x$, which is journaled, as hereinafter explained, about the axis of the shaft 1 and is made rigid with the member $14^a$ by means of the axles 17 17, on which are journaled gears 18 18, (preferably two, at diametrically opposite positions,) said gears meshing with and deriving power from the gear 13. On the sleeve 3 there is also journaled a gear 20, having keyed fast to it a disk 21, which extends within the brake-flange $5^a$, and the gear 18 has rigid with it a smaller gear 22, which meshes with the gear 20 for giving the latter reduced speed in the same direction as the gear 13. The gear 18 also meshes at its outer side with an internal gear 24, formed within and as a part of a gear-housing, which comprises, in addition to the portion 25, integral with the gear 24, a disk $25^a$, which extends to a hub $25^b$, encompassing the axles 17, and a disk 26, which is journaled about the hub of the member $14^x$ of the gear-frame and extends out alongside of the disk 21 within the friction-flange $5^a$ and is made fast near the outer circumference to the other member 25 of the gear-housing by bolts 27. At the margin of the brake-flange $5^a$ it is provided with an internal gear-rim $5^b$, as above mentioned, and the disks 21 and 26 are peripherally toothed for engagement therewith. The action of these parts is substantially that of a clutch—that is, such that the engaged parts have the same rotary motion. The vehicle-frame is provided with two rotary stops 30 and 31, between which the frusto-conical shoe 16 is situated, said stops being in position to arrest the lateral movement of the gear-frame when it is moved by said shoe and to afford a resistance against which the shoe will be forced into secure frictional engagement with one or the other of the oppositely-sloping faces of the friction-flange upon which the friction-sheathing 15 is provided. The construction of this gear-train as above described is such, it will be noticed, that when the gear-frame is held at rest by the shoe 16 forcing said frame over against the stop 30 the gear-housing comprising the internal gear 24 derives from the power-gear 13 rotation in the opposite direction from said gear 13 and the power-shaft, and at this position of the housing, the disk 26 being engaged with the rim $5^b$ of the brake-flange rigid with the power-transmiting wheel 4, such opposite rotary motion is communicated directly to said power-transmitting wheel. At the same time the disk 21 derives motion in opposite direction to that of the disk 26 by the engagement of the gear 22 with the gear 20, and said gears are proportioned as to their respective diameters so that the speed of such opposite rotary motion of the disk 21 is greater than that of the disk 26. When, therefore, the gear-frame is shifted in the opposite direction, so as to be pressed against the stop 31 and held against rotation by the engagement of the shoe with the oppositely-sloped friction-surface 15, the disk 21 coming into engagement with the teeth $5^b$, the power-transmitting wheel 4 will derive rotary motion in the same direction as the gear 13 and power-shaft at a speed somewhat greater than the reverse speed communicated through the disk 26 in the other adjustment; but both of these speeds, it will be noticed, will be relatively slow as compared with the speed of the power shafts and wheel.

A brake-strap 32 encompasses the brake-flange $5^a$, operating in a familiar manner. Any suitable means may be provided (none being illustrated in the drawings) for shifting the frusto-conical shoe 16 in opposite directions to give the slow forward or slower reverse movement, and at intermediate position, at which the shoe does not engage either of the slopes of the frictional flange of the gear-frame, said gear-frame being free to rotate about the power-shaft and the two disks 21 and 26 being both out of engagement with the internal gear-rim $5^b$ of the brake-flange, which at the intermediate adjustment of the gear-frame stands intermediate the two disks, the entire gear-train carried by the gear-frame will rotate bodily idly—that is, without performing any work in propelling the vehicle, the latter being propelled forward at full speed by the engagement of the power-wheel with the flange 7 of the power-sleeve 3, communicating directly to the power-transmitting wheel the full rotary speed of the power-shaft. It will be understood that the cam 12 will be operated to disengage the flange 7 from the power-wheel before operating the shoe 16 in either direction for either of the slower speeds, forward or reversed.

I claim—

1. A power-transmitting mechanism comprising a power-shaft and power-wheel thereon; a power-transmitting wheel loose on the power-shaft and disengageably engageable with the power-wheel; a gear rigid with the power-wheel and a speed-reducing gear-train therefrom to the power-transmitting wheel; a frame for carrying the intermediate gear-train which is mounted rotatably about the power-shaft, and means for holding such frame against rotation.

2. A power-transmitting mechanism comprising a power-shaft and a power-wheel thereon; a power-transmitting wheel loose on the power-shaft and disengageably engageable with the power-wheel; a gear rigid with the power-wheel, and a direction-reversing gear-train therefrom to the power-transmitting wheel; a frame for carrying the intermediate gears of the train which is mounted rotatably about the power-shaft, and means for holding such frame against rotation.

3. A power-transmitting mechanism comprising a power-shaft and a power-wheel thereon; a power-transmitting wheel loose on the power-shaft and disengageably engageable with the power-wheel; a gear rigid with the power-wheel; a gear-train operated by said gear comprising two oppositely-rotating elements both journaled about the power-shaft; means rigid with the power-transmitting wheel adapted for engagement with each of said oppositely-rotated elements, and means for moving said elements at will into and out of such engagement.

4. A power-transmitting mechanism comprising a power-shaft and a power-wheel thereon; a power-transmitting wheel loose on the power-shaft and disengageably engageable with the power-wheel; a gear rigid with the power-wheel; a gear-train operated by said gear comprising two differently-speeded elements; means rigid with the power-transmitting wheel adapted for engagement with each of said differently-speeded elements, and means for moving said elements at will into and out of such engagement.

5. A power-transmitting mechanism comprising a power-shaft and a power-wheel thereon; a power-transmitting wheel loose on the power-shaft disengageably engageable with the power-wheel; a gear rigid with the power-wheel and a speed-reducing and direction-reversing gear-train therefrom to the power-transmitting wheel; a gear-frame for carrying the intermediate gears of the train which is mounted rotatably about the power-shaft, and means for holding such frame against rotation.

6. A power-transmitting mechanism comprising a power-shaft and a power-wheel thereon; a power-transmitting wheel loose on the power-shaft and disengageably engageable with the power-wheel; a gear rigid with the power-wheel; a gear-train operated by said gear comprising two oppositely-rotated and differently-speeded elements both journaled about the power-shaft; means rigid with the power-transmitting wheel adapted for engagement with each of said oppositely-rotated and differently-speeded elements, and means for moving said elements at will into and out of such engagement.

7. A power-transmitting mechanism comprising a power-shaft and a power-wheel thereon; a power-transmitting wheel loose on the power-shaft disengageably engageable with the power-wheel; a gear rigid with the power-wheel; a gear-train operated by said gear comprising two oppositely-rotated elements both journaled about the power-shaft; means rigid with the power-transmitting wheel adapted for engagement with each of said oppositely-rotated elements; a frame by which said gear-train is carried, and means for moving the frame at will to carry said oppositely-rotated elements into and out of such engagement.

8. A power-transmitting mechanism comprising a power-shaft and a power-wheel thereon; a power-transmitting wheel loose on the power-shaft and disengageably engageable with the power-wheel; a gear rigid with the power-wheel; a gear-train operated by said gear comprising two oppositely-rotated elements both journaled about the power-shaft; means rigid with the power-transmitting wheel adapted for engagement with each of said oppositely-rotated elements; a frame on which said gear-train is carried mounted for rotation about the power-shaft; means for moving it at will to carry said oppositely-rotated elements into into and out of engagement with the power-transmitting wheel and for holding said frame against rotation at both limits of such movement.

9. A power-transmitting mechanism comprising a power-shaft and a power-wheel thereon; a power-transmitting wheel having a sleeve by means of which it is journaled loose on the power-shaft, and disengageably engageable with the power-wheel; a gear rigid with the power-wheel; a gear-train comprising a spur-wheel and an internal gear both journaled about the sleeve, and gear connections extending from the gear which is rigid with the power-wheel, both to the spur-gear and to the internal gear for communicating to them respectively opposite rotation, the spur-gear and the internal gear having each rigid with it an element adapted for driving engagement, the power-transmitting wheel having means for such engagement; a frame in which the gear-train is carried movable longitudinally with respect to the power-shaft for carrying said elements into and out of engagement with the power-transmitting wheel.

10. A power-transmitting mechanism comprising a power-shaft and a power-wheel thereon; a power-transmitting wheel loose on the power-shaft and disengageably engageable with the power-wheel; a gear rigid with the power-wheel; a gear-train therefrom to the power-transmitting wheel comprising two oppositely-rotated elements each adapted for engagement with the power-transmitting wheel, the power-transmitting wheel having rigid with it a brake-flange, said brake-flange having the means for engagement with said oppositely-rotated elements of the gear-train, the frame on which the gear-train is carried being movable longitudinally with respect to the shaft to carry said elements into and out of such engagement.

11. A power-transmitting mechanism comprising a power-shaft and a power-wheel thereon; a power-transmitting wheel loose on the power-shaft and disengageably engageable with the power-wheel; a gear rigid with the power-wheel, and a gear-train therefrom to the power-transmitting wheel comprising an element adapted to be moved into and out of engagement with the power-transmitting wheel; a frame on which the gear-train is carried mounted for rotation about the power-shaft, movable longitudinally with respect thereto for carrying said element into and out of such engagement with the power-transmitting wheel, said gear-carrying frame having a friction-flange; means mounted on the main frame for engagement with such friction-flange to hold the frame against rotation, such means being movable longitudinally with respect to the shaft for carrying the gear-frame longitudinally, and a stop on the main frame which arrests such movement of the gear-frame.

12. A power-transmitting mechanism comprising a power-wheel and a gear rigid therewith; a gear-train operated by said gear comprising two oppositely-rotated elements both journaled about the axis of the power-wheel; a power-transmitting wheel adapted for engagement with each of said oppositely-rotated elements, and a frame in which said gear-train is carried mounted for rotation about the axis of the power-wheel and for movement at will longitudinally with respect thereto to carry said oppositely-rotated elements into and out of such engagement, said frame having two friction-faces; a friction-shoe mounted on the frame for encounter with said faces respectively by movement in opposite directions; said shoe being adapted to be moved to engage and move the gear-frame, and stops on the main frame for limiting the movement of the gear-frame in said opposite directions.

13. A power-transmitting mechanism comprising a power-shaft and a power-wheel thereon; a power-transmitting sleeve on the shaft having a clutch member and means for power-transmitting engagement with said wheel; a gear rigid with the wheel concentric with the shaft exterior to the sleeve; a gear-train comprising a spur-wheel and an internal gear, both journaled about the sleeve, and gear connections extending from the first-mentioned gear both to the spur-gear and to the internal gear for communicating to the latter respectively opposite rotation, the spur-gear and the internal gear each having a clutch member, the bearing-support for said gear being movable longitudinally with respect to the shaft for carrying the clutch members of said gears into and out of engagement with the clutch member on the sleeve.

14. A power-transmitting mechanism comprising a power-shaft and a power-wheel thereon; a power-transmitting sleeve journaled on the shaft having power-transmitting engagement with the wheel and movable longitudinally on the shaft to engage it with and disengage it from the wheel; a gear concentric with the shaft outside the sleeve having rigid connection with the wheel; a gear-train connecting said gear with the sleeve comprising a spur-gear journaled about the sleeve; an internal gear also journaled thereabout, and intermediate gears communicating power from the first-mentioned gear to said spur-gear and internal gear respectively; a clutch member on the sleeve and clutch members on said spur-gear and internal gear respectively for engagement with the clutch member on the sleeve; means for moving the sleeve into and out of engagement with the wheel and means for moving the gear clutch members into and out of engagement respectively with the sleeve clutch member.

15. A power-transmitting mechanism comprising a power-shaft; a wheel fast thereon for rotation; a power-transmitting sleeve on the shaft; means for engaging it with and disengaging it from the wheel; a gear concentric with the shaft exterior to the sleeve and rigidly connected with the wheel for rotation; a gear-carrying frame mounted for rotation about the shaft; a gear-train carried by said frame of which the first wheel is engaged with the first-mentioned gear, and which comprises a wheel having a clutch member; a coöperating clutch member on the sleeve and means for holding the gear-frame against rotation.

16. A power-transmitting mechanism comprising a power-shaft and a power-wheel thereon; a power-transmitting sleeve on the shaft having disengageable power-transmitting engagement with the wheel; a gear concentric with the shaft exterior to the sleeve, rigid with the wheel; another gear journaled about the shaft having a clutch member; gear connections from the first-mentioned gear to the second; a frame on which said intermediate gear connections are carried mounted for rotation about the shaft, and means for holding said frame against rotation.

17. A power-transmitting mechanism comprising a power-shaft; a power-transmitting wheel loose on the power-shaft; a gear rigid with said shaft, and a speed-reducing gear-train intermediate said rigid gear and power-transmitting wheel; a frame for carrying said intermediate gear-train which is mounted rotatably about the power-shaft, and means for holding such frame against rotation.

18. A power-transmitting mechanism comprising a power-shaft; a power-transmitting wheel loose on the power-shaft; a gear rigid with the power-shaft and a motion-reversing train intermediate said rigid gear and the power-transmitting wheel; a frame for carrying the intermediate gear-train which is mounted rotatably about the power-shaft, and means for holding such frame against rotation.

19. A power-transmitting mechanism comprising a power-shaft; a power-transmitting wheel loose on the shaft; a gear rigid with the power-shaft; a gear-train operated by said rigid gear comprising two differently-speeded elements; means rigid with the power-transmitting wheel adapted for engagement with each of said differently-speeded elements, and means for moving said elements at will into and out of such engagement.

20. A power-transmitting mechanism comprising a power-shaft; a power-transmitting wheel loose on the shaft; a gear-train operated by said gear extending to and comprising two oppositely-rotating elements; means rigid with the power-transmitting wheel adapted for engagement with each of said oppositely-rotating elements, and means for moving said elements at will into and out of such engagement.

21. A power-transmitting mechanism comprising a power-shaft; a power-transmitting wheel loose on the shaft; a gear rigid with the power-shaft, and a speed-reducing and direction-reversing gear-train intermediate said rigid gear and the power-transmitting wheel; a gear-frame for carrying the intermediate gear-train which is mounted rotatably about the power-shaft, and means for holding such frame against rotation.

22. A power-transmitting mechanism comprising a power-shaft; a power-transmitting wheel loose on the shaft; a gear rigid with the shaft; a gear-train operated by said rigid gear comprising two oppositely-rotated and differently-speeded elements; means rigid with the power-transmitting wheel adapted for engagement with each of said oppositely-rotated and differently-speeded elements, and means for moving said elements at will into and out of such engagement.

23. A power-transmitting mechanism comprising a power-shaft; a power-transmitting wheel loose on the shaft; a gear rigid with the shaft; a gear-train operated by said rigid gear comprising two oppositely-rotated elements; means rigid with the power-transmitting wheel adapted for engagement with each of said oppositely-rotated elements; a frame by which such gear-train is carried, and means for moving the frame at will to carry said oppositely-rotated elements into and out of such engagement.

In testimony whereof I have hereunto set my hand, in the presence of two witnesses, at Kenosha, Wisconsin, this 22d day of March, 1905.

ROBERT SYMMONDS, Jr.

In presence of—
T. L. KNAPP,
H. DEVINE.